US010623956B2

(12) United States Patent
Nathan et al.

(10) Patent No.: US 10,623,956 B2
(45) Date of Patent: Apr. 14, 2020

(54) REQUEST FOR NETWORK CREDENTIAL (71) Applicant: Hewlett-Packard Development Company, L.P., Houston, TX (US)

(72) Inventors: Nobuko M Nathan, Encinitas, CA (US); Laurel Lasslo, San Diego, CA (US); David Jerome Shaber, Nampa, ID (US); Hunter John Simington, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 173 days.

(21) Appl. No.: 15/505,286

(22) PCT Filed: Aug. 21, 2014

(86) PCT No.: PCT/US2014/052190
§ 371 (c)(1),
(2) Date: Feb. 21, 2017

(87) PCT Pub. No.: WO2016/028304
PCT Pub. Date: Feb. 25, 2016

(65) Prior Publication Data
US 2017/0272953 A1 Sep. 21, 2017

(51) Int. Cl.
*H04W 12/08* (2009.01)
*H04L 29/06* (2006.01)
(Continued)

(52) U.S. Cl.
CPC .......... *H04W 12/08* (2013.01); *H04L 63/083* (2013.01); *H04L 63/0853* (2013.01);
(Continued)

(58) Field of Classification Search
CPC ..... H04W 12/08; H04W 88/02; H04W 84/12; H04W 12/0608; H04N 1/4413;
(Continued)

(56) References Cited

U.S. PATENT DOCUMENTS 7,306,153 B2 12/2007 Chong et al.
7,616,594 B2 11/2009 Roberts et al.
(Continued)

FOREIGN PATENT DOCUMENTS

WO WO-02060204 A1 8/2002
WO WO-2010098749 A1 9/2010
WO WO-2012151486 A2 11/2012

OTHER PUBLICATIONS

Apple, "Wi-Fi base stations: Setting up and configuring an extended wireless network (802.11n)," Feb. 9, 2011, <http://support.apple.com/kb/ht4259>, 2 pages.
(Continued)

*Primary Examiner* — Meng Li
(74) *Attorney, Agent, or Firm* — HP Inc. Patent Department (57) ABSTRACT

Examples disclosed herein relate to a request for a network credential. Examples include to acquire, in a first device, a request for the network credential from a second device. The first device to display a prompt for the network credential on a display. The first device to acquire an input network credential via a user interface device. The first device to determine whether the input network credential is valid to access a network and provide the input network credential from the first device to the second device when the input credential is valid.

10 Claims, 4 Drawing Sheets (51) Int. Cl.
  *H04W 12/06* (2009.01)
  *H04N 1/00* (2006.01)
  *H04N 1/44* (2006.01)
  *H04W 84/12* (2009.01)
  *H04W 88/02* (2009.01)
(52) U.S. Cl.
  CPC ......... *H04L 63/10* (2013.01); *H04N 1/00278* (2013.01); *H04N 1/00307* (2013.01); *H04N 1/4413* (2013.01); *H04W 12/0608* (2019.01); *H04N 2201/0094* (2013.01); *H04W 84/12* (2013.01); *H04W 88/02* (2013.01)
(58) Field of Classification Search
  CPC ........... H04N 1/00278; H04N 1/00307; H04N 2201/0094; H04L 63/0853; H04L 63/083; H04L 63/10
  See application file for complete search history.

(56) References Cited

U.S. PATENT DOCUMENTS

| | | | |
|---|---|---|---|
| 7,710,587 B2 | 5/2010 | Crosier et al. | |
| 7,940,732 B2 | 5/2011 | Lowry et al. | |
| 8,079,073 B2 | 12/2011 | Roberts | |
| 8,305,604 B2 | 11/2012 | McIntyre | |
| 8,539,047 B2 | 9/2013 | McNulty | |
| 8,542,833 B2 | 9/2013 | Devol et al. | |
| 2004/0116109 A1 | 6/2004 | Gibbs et al. | |
| 2006/0067295 A1 | 3/2006 | Lehotsky et al. | |
| 2006/0105714 A1 | 5/2006 | Hall et al. | |
| 2006/0251256 A1 | 11/2006 | Asokan et al. | |
| 2007/0143456 A1 | 6/2007 | Mashinsky | |
| 2009/0125713 A1 | 5/2009 | Karschnia et al. | |
| 2010/0024003 A1 | 1/2010 | Malledant et al. | |
| 2010/0115108 A1 | 5/2010 | Wang et al. | |
| 2010/0182633 A1 | 7/2010 | Wu et al. | |
| 2011/0310787 A1* | 12/2011 | Sheriff | H04W 76/15 370/315 |
| 2011/0321147 A1 | 12/2011 | Chakra et al. | |
| 2012/0309318 A1 | 12/2012 | Matsuo et al. | |
| 2013/0014232 A1* | 1/2013 | Louboutin | H04M 1/72527 726/5 |
| 2013/0081121 A1 | 3/2013 | Green et al. | |
| 2013/0196647 A1* | 8/2013 | Raleigh | H04W 12/06 455/418 |
| 2013/0241693 A1* | 9/2013 | Miyamoto | H04W 12/06 340/5.6 |
| 2013/0288601 A1* | 10/2013 | Chhabra | H04W 4/001 455/41.2 |
| 2013/0321856 A1 | 12/2013 | Bell et al. | |
| 2014/0007209 A1* | 1/2014 | Zucker | H04W 12/06 726/7 |
| 2014/0026193 A1 | 1/2014 | Saxman et al. | |
| 2014/0119298 A1* | 5/2014 | Jeon | H04W 76/11 370/329 |

OTHER PUBLICATIONS

Brother, "How do I configure the wireless printer using a USB or Ethernet cable and install the printer driver in Windows?," Jun. 29, 2011, http://www.brother-usa.com, 8 pages.
EFI "PrintMe Mobile Administrator's Guide, version 2.3," (Web Page), Aug. 27, 2012, 25 pages, http://w3.efi.com/.
Jerremy-Tamlin, "HowTo: Configure Wireless for HP Deskjet 3050 All-In-One J610a on Ubuntu 10.04," ubuntu forums, thread, May 31, 2011, 7 pages.
Kodak, "Networking Your Printer," Kodak ESP Office 6100 Series All-in-One Printer—Extended User Guide, Nov. 28, 2010, <http://web.archive.org/web>, 6 pages.
Lexmark, "How to Access the Printer's Web Page or Embedded Web Server; A Communication Test and a Brief Description of Settings," Dec. 4, 2010, 5 pages.
Sam Costello, "How to Set Up Apple Airport Express," About.com, Jan. 28, 2009, 6 pages, <http://ipod.about.com/od/usingairportexpress/ss/airport-express,htm>.

* cited by examiner

REQUEST FOR NETWORK CREDENTIAL

BACKGROUND

Various types of devices may be used in a wireless network environment. To prevent unwanted attack or access to a wireless network environment, access may be limited by the use of a network credential. Only devices with the correct network credential may be provided access to the wireless network environment.

BRIEF DESCRIPTION OF THE DRAWINGS

The following detailed description references the drawings, wherein.

DETAILED DESCRIPTION

As used herein, a "network credential" (or "credential") is any credential which may be used to access a wireless network. For example, a credential may be a username and password, a keycode, etc. A "computing device" or "device" may be a desktop computer, laptop (or notebook) computer, workstation, tablet computer, mobile phone, smartphone, smart watch, smart wearable glasses, smart device, server, blade enclosure, imaging device, or any other processing device or equipment with an transceiver, transponders, transverters, repeaters, etc. to access a network. The computing device may be to access a wireless network. A "mobile device" may be any device which may be easily moved, such as, a laptop computer, a tablet computer, mobile phone, smartphone, smart watch, smart wearable glasses, etc. An "imaging device" may be a hardware device, such as a printer, multifunction printer (MFP), or any other device with functionalities to physically produce graphical representation(s) (e.g., text, images, models etc.) on paper, photopolymers, thermopolymers, plastics, composite, metal, wood, or the like. In some examples, an MFP may be capable of performing a combination of multiple different functionalities such as, for example, printing, photocopying, scanning, faxing, etc. A "smart device" may be a device capable of connecting to other devices or networks via different protocols (e.g., Bluetooth, near field communication (NFC), Wi-Fi, 3G, 4G, etc.), that may operate to some, extent interactively and autonomously, such as a smoke detector, a refrigerator, a toaster, a thermostat, a carbon monoxide detector, a home security system, a microwave, a garage door open, a sprinkler system, a medicine cabinet, a coffee machine, a solar panel, a webcam, a door locks, a light bulb, a system stick (e.g., Google Chromecast HDMI Streaming Media Player), a car, a set top box, a network share device, a cable television box, a wireless print accessory, etc.

In examples described herein, a "request for a network credential" may be a request from a first device to a second device for a network credential of a wireless network. The request for a network credential may be transmitted from a first device to a second device using any connection between the devices, such as a wireless connection (e.g., NFC, Wi-Fi, Bluetooth, etc.) or a wired connection (e.g., USB, Ethernet, etc.) A response from the second device to the first device may be provided via any connection between the first device and the second device. In an example, the first device may be a mobile device and the second device may be an imaging device and the request for a network credential and the response may be transmitted via Wi-Fi.

A number of devices may request access to a network. Access to a network may require entry of a network credential (e.g., passwords, keycodes, etc.). Network credentials are often very long and complex. Such complex and long network credentials may not be easy to remember. In addition, users may incorrectly input such long and complex network credentials. There are many reasons why a device may not be able to connect to a wireless network other than a network credential failure. For example, a device may not be able to connect to a wireless network when the signal strength of the wireless network is not strong. However, some devices may not be able to inform a user that an input network credential has failed to provide access to the network. For example, a smart refrigerator may not provide a reason for the failure to connect to a wireless network.

To address these issues, in the examples described herein, a first device may eliminate incorrectly entered network credentials as a reason for failure to connect to a wireless network. The first device may provide a received network credentials to a second device after verifying the received network credential is valid to access to a network. In this manner, examples described herein may significantly simplify connecting a device to a wireless network.

Figure 1:
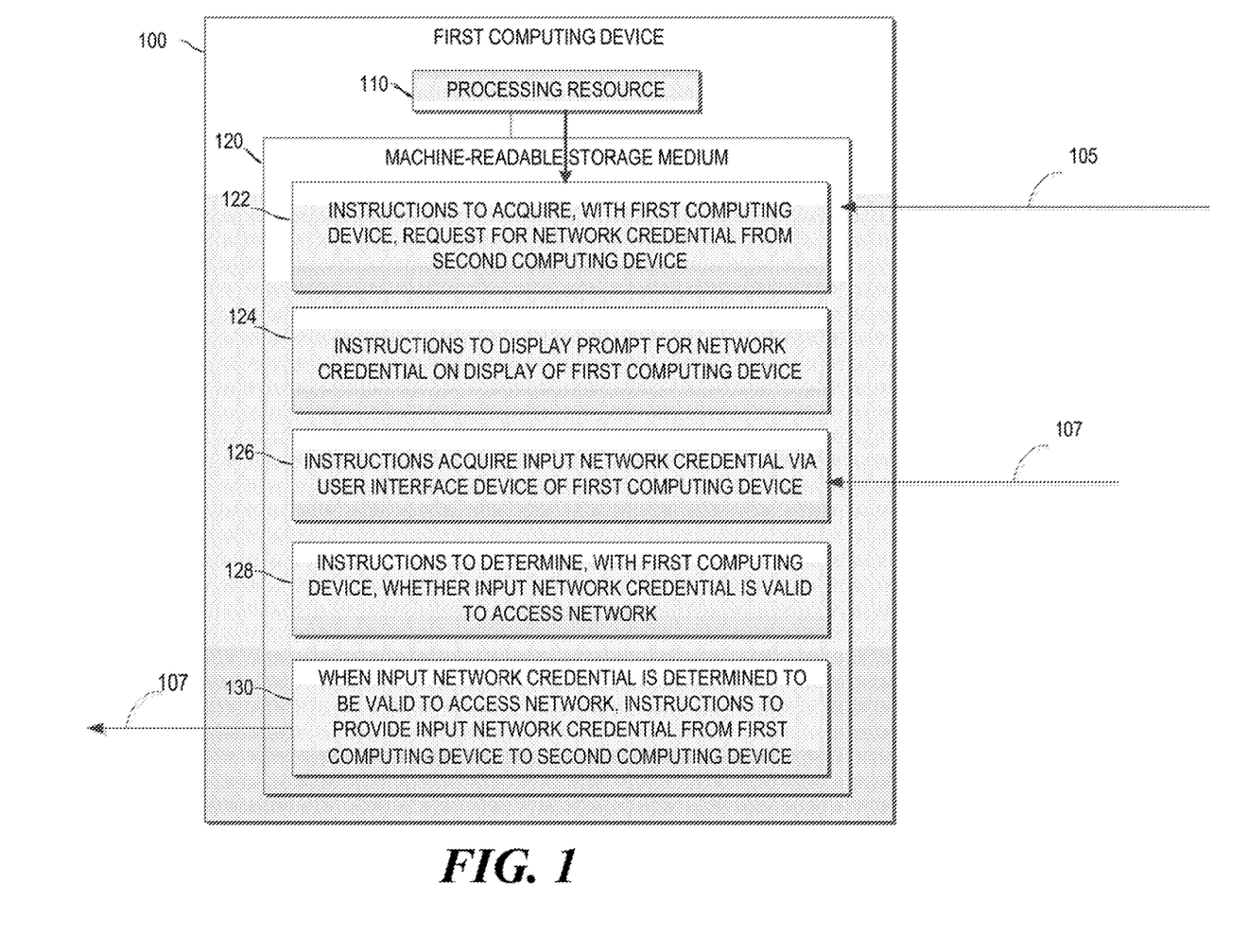
FIG. 1 is a block diagram of an example computing device to provide a network credential to a computing device.

Referring now to the drawings, FIG. 1 is a block diagram of an example first computing device 100 to provide a network credential to a second computing device. In the example of FIG. 1, first computing device 100 includes a processing resource 110 and a machine readable storage medium 120 comprising (e.g., encoded with) instructions 122, 124, 126, 128, and 130 executable by processing resource 110. In some examples, storage medium 120 may include additional instructions. In some examples, instructions 122, 124, 126, 128, 130, and any other instructions described herein in relation to storage medium 120, may be stored on a machine-readable storage medium remote from but accessible to first computing device 100 and processing resource 110 (e.g., via a computer network). In some examples, instructions 122, 124, 126, 128, and 130 may be instructions of a computer program, computer application (app), agent, or the like, of first computing device 100. In other examples, the functionalities described herein in relation to instructions 122, 124, 126, 128, and 130 may be implemented as engines comprising any combination of hardware and programming to implement the functionalities of the engines, as described below.

In examples described herein, a processing resource may include, for example, one processor or multiple processors included in a single computing device (as shown in FIG. 1) or distributed across multiple computing devices. A "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution of instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

As used herein "network" refers to any computing network requiring credentials to access the network. For example, a network may require a username and password. In some examples, the network may be at least one of a wireless personal area network (WPAN), wireless mesh network, wireless metropolitan area networks, WiMAX, wireless wide area networks, cellular network, Global System for Mobile Communications (GSM), Personal Communications Service (PCS), Digital Advanced Mobile Phone Service, Wi-Fi network, Wi-Lan, a general packet radio service (GPRS) network. The devices may be connected to each other through a wired connection (e.g., local area network (LAN), etc.) or a wireless connection (e.g., wireless local area network (WLAN), Bluetooth, etc.).

In the example of FIG. 1, instructions 122 may passively acquire (i.e., receive) or actively acquire (e.g., retrieve) with first computing device 100 a request 105 for a network credential from a second computing device. In an example, the network may be any wireless network which may require a network credential for access. In such examples, the network credentials may be any type of data to provide access to the wireless network. In an example, the credentials may include a username, a password, a keycode, etc. For example, the network may be at least one of a wireless local area network (Wi-LAN), wireless personal area network (WPAN), a wireless mesh network, a wireless metropolitan area networks, a worldwide interoperability for microwave access (WiMAX), a wireless wide area networks, a cellular network, a Global System for Mobile Communications (GSM), a Personal Communications Service (PCS), a digital advanced mobile phone service, a Wi-Fi network, etc. The second computing device may be any computing device which may seek access to the network and may receive the network credential from another computing device.

In instructions 124, the first computing device 100 may display a prompt for the network credential on a display of the first computing device 100. In some examples, the prompt may be a displayed as a pop-up message on the display of first computing device 100. The prompt may include an input area to receive an input network credential (e.g., a password, username, keycode, etc.) via a user interface device of the first computing device 100.

In instructions 126, first computing device 100 may passively acquire (i.e., receive) or actively acquire (e.g., retrieve) an input network credential 107 via the user interface device of first computing device 100. The user interface device of first computing device 100 may be a hardware device to receive input data, such as, of a touchpad, a touchscreen, a keyboard, a mouse, a microphone, etc., and machine readable instructions to support such hardware. In an example, the first computing device 100 may be a smartphone and the prompt for the network credential may be displayed on the display of the smartphone. In such an example, a response to the prompt may be received through a microphone in the smartphone with a voice-to-text application installed therein.

In instructions 128, first computing device 100 may determine whether the input network credential 107 is valid to access the network. In an example, first computing device 100 may determine the input network credential 107 is valid when a connection process to the network is successful. As used here, a "connection process" may refer to any process performed by a computing device to connect with a network. For example, a computing device may transmit via a transceiver a request to access a network and receive a response to the request via the transceiver. In an example, the first computing device 100 may perform a connection process to connect to the network using the input network credential 107. In another example, the first computing device 100 may have a stored network credential of the network in memory storage of the first device 100 which is used to connect to the network. In such an example, the first computing device 100 may be connected to the network with the stored network credential and may disconnect from the network before the connection process with the input network credential 107 is attempted.

For example, the first computing device 100 may be a smartphone with a stored network credential to access a Wi-Fi network in memory storage. In response to receipt of the input network credential 107 the smartphone may disconnect from the Wi-Fi network and perform a connection process to attempt to connect to the Wi-Fi network using the input network credential 107. In such an example, the operating system (e.g., Android, iOS®, Windows®, etc.) of the smartphone may prevent access to and sharing of the stored network credential. In another example, first computing device 100 may compare the input network credential 107 with the stored network credential to determine whether the input network credential is valid to access the network.

In instructions 130, when the input network credential 107 is determined to be valid to access the network, the first computing device 100 may provide the input network credential 107 to the second computing device. In such an example, the input network credential may be provided to the second computing device via a wireless connection (e.g., NFC, Wi-Fi, Bluetooth, etc.) or a wired connection (e.g., USB, Ethernet, etc.).

In an example, the first computing device 100 may be a tablet computer and the second device may be an imaging device and the network a Wi-Fi network. In such an example, the tablet computer may display a prompt for network credentials in response to a request for network credentials from the imaging device received through a Bluetooth connection. In response to receiving input network credentials for the Wi-Fi network, the tablet computer may perform the connection process to attempt to connect to the Wi-Fi network using the input network credential. The tablet computer may provide the input network credential to the imaging device via the Bluetooth connection if the connection to the Wi-Fi network is successful. In another example, the second device may be a smart device, such as a smart thermostat, a smart refrigerator, etc.

In some examples, instructions 122, 124, 126, 128, and 130 may be part of an installation package that, when installed, may be executed by processing resource 110 to implement the functionalities described herein in relation to instructions 122, 124, 126, 128, and 130. In such examples, storage medium 120 may be a portable medium, such as a CD, DVD, flash drive, or a memory maintained by a computing device from which the installation package can be downloaded and installed. In other examples, instructions 122, 124, 126, 128, and 130 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-3.

Figure 2:
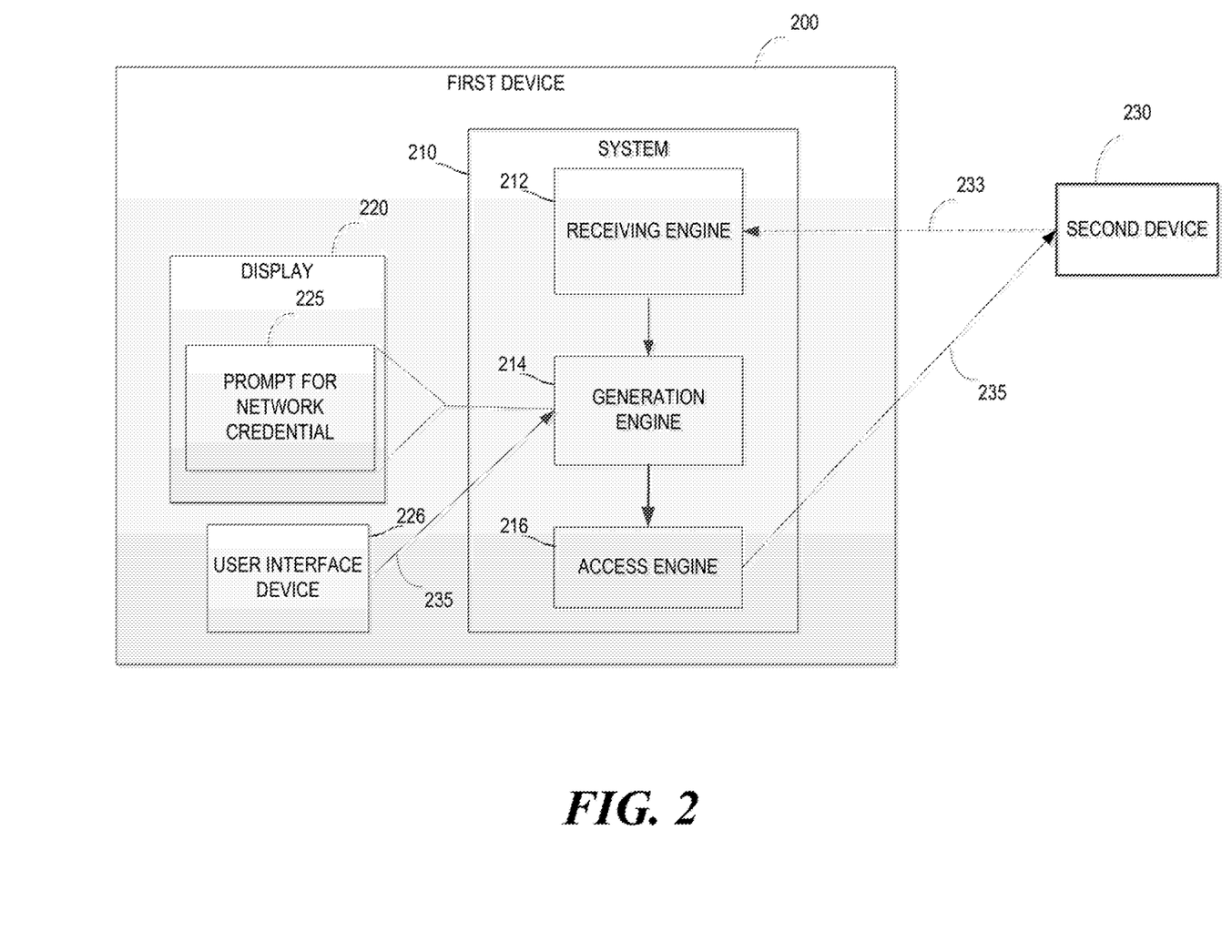
FIG. 2 is a block diagram of an example, system to provide a network credential to a computing device.

FIG. 2 is a block diagram of an example system 210 to provide a network credential 235 to a second computing device 230. System 210 may be part of first device 200. In the example of FIG. 2, system 210 includes at least engines 212, 214, and 216, which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 212, 214, and 216. In such examples, system 210 may include the machine-readable storage medium storing the instructions and the processing resource to execute the instructions, or the machine-readable storage medium may be separate but accessible to system 210 and the processing resource.

In some examples, the instructions can be part of an installation package that, when installed, can be executed by the processing resource to implement at least engines 212, 214, and 216. In such examples, the machine-readable storage medium may be a portable medium, such as a CD, DVD, or flash drive, or a memory maintained by a computing device from which the installation package can be downloaded and installed. In other examples, the instructions may be part of an application, applications, or component already installed on system 210 including the processing resource. In such examples, the machine-readable storage medium may include memory such as a hard drive, solid state drive, or the like. In other examples, the functionalities of any engines of system 210 may be implemented in the form of electronic circuitry.

In the example of FIG. 2, receiving engine 212 may passively acquire (i.e., receive) or actively acquire (e.g., retrieve) a request 233 for a network credential from a second device 230. The request 233 for the network credential may be any of the requests described above with respect to FIG. 1.

Generation engine 214 may generate a prompt for the network credential 225 to be displayed on the display 220 of the first device 200 and may receive an input network credential 235 from a user interface device 226 of the first device. The prompt for the network credential 225 may be any of the prompts described above with respect to FIG. 1. In some examples, the first device 200 may be a tablet computer and the prompt for the network credential 225 may be a pop-up request displayed on a display of the tablet computer. In such an example, the user interface device 226 may be a touch pad of the tablet computer. In some examples, the prompt for the network credential 225 may include a request for a username and password to access the network.

In some examples, the generation engine 214 may, upon receipt of the request 233 for the network credential, determine whether a memory storage of the first device 200 includes a stored network credential for the network. In such an example, the generation engine may determine whether the stored network credential may be provided to the second device 230 and generate the prompt for the network credential 225 when it is determined that the stored network credential may not be provided to the second device 230.

Access engine 216 may determine whether the input network credential 235 provides access to the network and may provide the input network credential 235 to the second device 230 when the input network credential 235 is determined to provide access to the network. In the example of FIG. 2, the access engine 216 may disconnect from the network and perform a connection process using the input network credential 235. In such an example, the access engine 216 may provide the input network credential 235 to the second device 230 when the connection process is successful. In another example, the access engine 216 may determine the input network credential 235 is valid to access the network according to a comparison of the input network credential 235 with a stored network credential of the first device 200.

Figure 3:
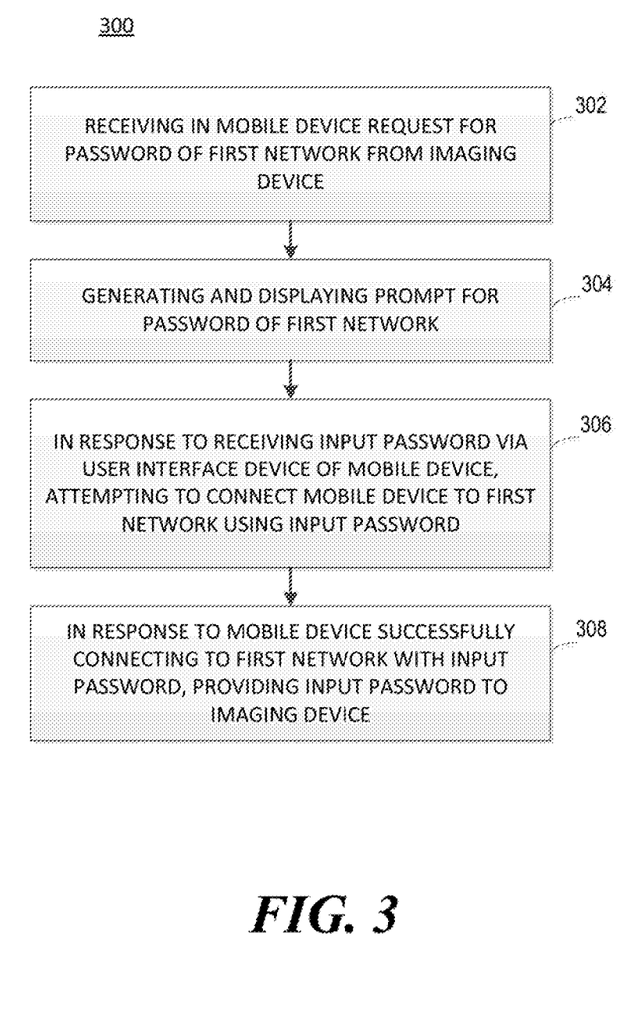
FIG. 3 is a flowchart of an example method for providing a network credential to a computing device.

FIG. 3 is a flowchart of an example method 300 for providing a network credential to a computing device. Although execution of method 300 is described below with reference to computing device 100 described above, other suitable systems (system 210) for the execution of method 100 can be utilized. Additionally, implementation of method 300 is not limited to such examples.

At 302 of method 300, first computing device 100 may receive a request 105 for a password of a first network from an imaging device. In the example of FIG. 3, first computing device 100 may be a mobile device.

At 304, the mobile device (e.g., first computing device 100) may generate and display a prompt for the password on a display of the mobile device.

At 306, in response to receiving an input password (e.g., network credential 107) via a user interface device of the mobile device (e.g., first computing device 100), the mobile device may attempt to connect to the first network using the input password (e.g., network credential 107). In some examples, the mobile device may disconnect from a second network before attempting to connect to the first network, for example, by performing a connection process. In other examples, the mobile device may not disconnect from any network before attempting to connect to the first network.

At 308, in response to the mobile device successfully connecting to the first network using the input password (e.g., network credential 107), the mobile device (e.g., first device 100) may provide the input password to the imaging device.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
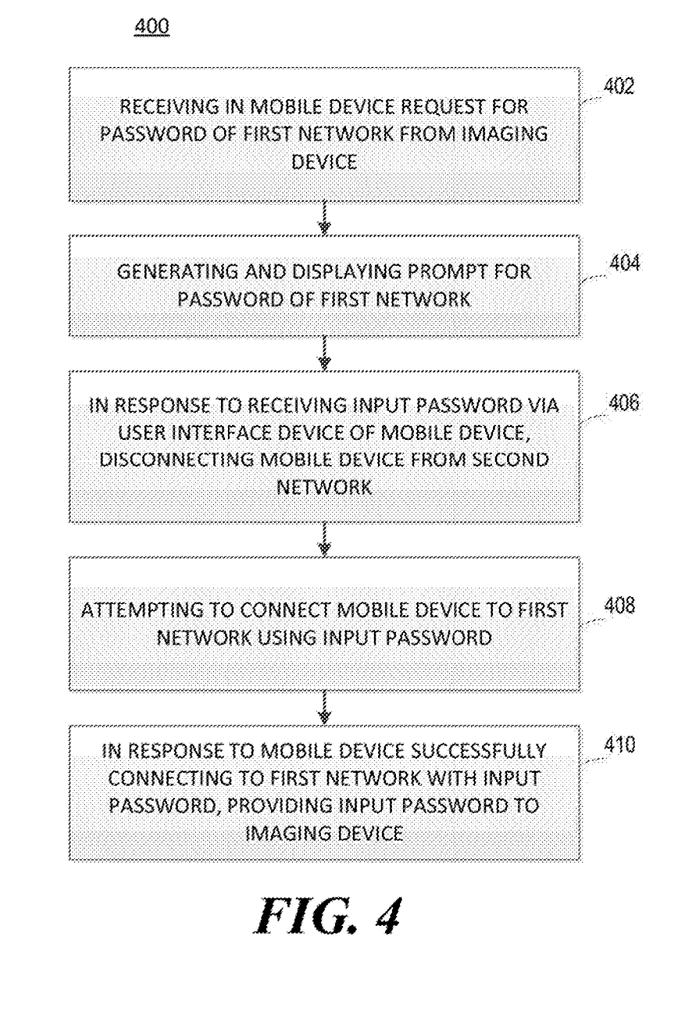
FIG. 4 is a flowchart of an example method for providing a network credential to an imaging device.

FIG. 4 is a flowchart of an example method 400 for providing a network credential to an imaging device. Although execution of method 400 is described below with reference to system 210 described above, other suitable systems (device 100) for the execution of method 400 can be utilized. Additionally, implementation of method 400 is not limited to such examples.

At 402 of method 400, first device 200 may receive a request 233 for a password of a first network from a second device 230. In the example of FIG. 4, the first device 200 may be a mobile device and the second device 230 may be an imaging device. The request 233 may be actively acquired or passively acquired.

At 404 the mobile device (e.g., first device 200) may generate and display a prompt (e.g., prompt for network credential 225) for the password on display (e.g., display 220) of the mobile device.

At 406, in response to receiving an input password (e.g., input network credential 235) via user interface device (e.g., user interface device 226), the mobile device (e.g., first device 200) may disconnect from a second network. In some examples, the first network and the second network may be the same network. For example, the first network and the second network may be the same Wi-Fi network. In such an example, the mobile device may have a stored network credential used to access the Wi-Fi network. In other examples, the first network and the second network may be different networks. For example, the first network may be a first Wi-Fi network and the second network may be a second Wi-Fi network accessible to the mobile device.

At 408, the mobile device may attempt to connect to the first network using the input password (e.g., input network credential 235).

At 410, in response to the mobile device successfully connecting to first network with input password (e.g., input network credential 235), the mobile device may provide the input password to the imaging device (e.g., second device 230).

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3.

What is claimed is:

1. A non-transitory machine-readable storage medium comprising instructions executable by a processing resource in a first computing device to:
   acquire, with the first computing device, a request for a network credential from a second computing device;
   responsive to acquiring the request from the second computing device, display, on a display of the first computing device, a prompt for the network credential to provide to the second computing device;
   acquire an input network credential via a user interface device of the first computing device;
   verify, by the first computing device, that the input network credential that has been acquired is valid to access a network before the first computing device provides the input network credential to the second computing device, by:
      disconnecting the first device from another network;
      after disconnecting the first device from the another network, performing a connection process to connect the first computing device to the network using the input network credential;
      in response to the connection process being successful, determining that the input network credential is valid; and
   in response to determining that the input network credential is valid to access the network, provide the input network credential from the first computing device to the second computing device, the second computing device using the input network credential provided by the first computing device to access the network.

2. The storage medium of claim 1, wherein the another network and the network are the same network.

3. The storage medium of claim 1, wherein the first device is a smartphone, and the second device is a multifunctional printer.

4. The storage medium of claim 3, wherein the user interface device is at least one hardware device.

5. The storage medium of claim 1, wherein the network is a Wi-Fi network.

6. A system comprising:
   hardware, including a processor and memory;
   a receiving engine implemented at least by the hardware to receive, in a first device, a request for a network credential of a network from a second device, the first device connected to the network using a stored network credential of the first device;
   a generation engine implemented at least by the hardware to determine that the stored network credential has not been provided to the second device, to in response to determining that the stored network credential has not been provided to the second device, generate a prompt for the network credential to be displayed on the first device, and to receive an input network credential from a user interface device of the first device; and
   an access engine implemented at least by the hardware to verify that the input network credential that has been acquired is valid to access the network before providing the input network credential to the second device when the input network credential is determined to provide access to the network,
   wherein the access engine performs a connection process to the network using the input network credential to determine whether the input network credential provides access to the network.

7. The system of claim 6, wherein the access engine is to disconnect the first device from the network when the input network credential is received, and, afterwards perform the connection process using the input network credential.

8. The system of claim 6, wherein the first device and the second device are connected via a wireless connection.

9. A method for accessing a network comprising:
   receiving in a mobile device a request for a password of a first network from an imaging device, the mobile device connected to the first network using a stored network credential;
   generating and displaying a prompt for the password of the first network;
   in response to receiving an input password via a user interface device of the mobile device, verifying that the input password is valid to access the first network before providing the input password to the imaging device, by matching the input password to the stored network credential; and
   in response to the mobile device verifying that the input password is valid to access the first network, providing the input password to the imaging device.

10. The method of claim 9, wherein generating and displaying a prompt for the password of the first network comprises:
    determining that the stored network credential has not been provided to the imaging device before generating and displaying the prompt for the password.

\* \* \* \* \*